UNITED STATES PATENT OFFICE.

HENRY J. GERSTENBERGER, OF CLEVELAND, OHIO, ASSIGNOR TO THE BABIES DISPENSARY & HOSPITAL OF CLEVELAND, OF CLEVELAND, OHIO, A CORPORATION OF OHIO.

COMPOSITION OF INGREDIENTS FOR ARTIFICIAL FOOD.

No Drawing. Application filed December 29, 1919, Serial No. 347,958. Renewed December 27, 1922.

*To all whom it may concern:*

Be it known that I, HENRY J. GERSTENBERGER, a citizen of the United States, residing at Cleveland, in the county of Cuyahoga and State of Ohio, have invented certain new and useful Improvements in Composition of Ingredients for Artificial Food, of which the following is a specification.

My invention relates to a new and useful composition of ingredients for artificial food to be used in the feeding of infants and children.

The main difficulty in connection with artificial feeding of infants has been the preparation of an artificial food that will simulate human milk in sufficient essentials to make possible two things: (1) the preparation of a formula which will be usable with good nutritional results without dilution or any other change, except in quantity, (2) the simplification of infant feeding, at least for the biggest percentage of infants, so that the general practitioner could feed many more infants with good results than he now can, and in this manner contribute much toward the preservation of the health and strength of the infant.

It is believed by investigators that an artificial food in order to be a satisfactory food should contain at least the minimum amounts of various food constituents, such as proteins and albuminoids, fats and lipoids, carbohydrates, salts, water, "accessory food factors" contained in human milk and should be similar to human breast milk in various physical, chemical, biological and hygienic characteristics as freezing point, reaction, electrical conductivity, energy value, bacterial freedom, freshness, anti-rachitic value and anti-scorbutic value. Accessory food factors are substances of unknown chemical and physical make up that are essential to normal maintenance and growth of the body. The term vitamine is sometimes used synonomously for accessory food factors.

It is a universally recognized fact that infants, especially young infants, cannot take as high a percentage of cow's milk fat in their food as they can of human breast milk fat.

Breast milk fat and cow's milk fat vary considerably in their saponification, iodin, Polenske and Reichert-Meissl numbers. The last named number designates the amount of volatile fatty acids present in the fat. Breast milk fat contains about 1.6 per cent., whereas cow's milk fat contains 10 per cent. These volatile fatty acids are considered by authors, such as Bokai, Bahrdt and Czerny, to play an important part in the production of not only the chronic but also the acute nutritional disturbances of infants.

Breast milk contains a high percentage of fat. Artificial milk formulas contain decidedly less, except when the infants have nearly finished the more difficult first half-year. This high fat content in human milk is unquestionably present for a good reason. Czerny long ago expressed the belief that a food high in fats raises the immunity of the child, and that one low in fats and high in carbohydrates reduces it.

Therefore, I have made a fat that has, within the variations found with human breast milk fat, approximately the same Reichert-Meissl, saponification, iodin, Polenske numbers and melting point as has human breast milk fat and one that is more anti-rachitic than is cow's milk fat. The anti-rachitic result can be obtained by simply adding cod liver oil to the milk in the proper proportion.

By properly mixing this fat with other ingredients I have been able to produce an artificial food for infants and young children which simulates human breast milk in essential characteristics more than any other milk heretofore made. The composition comprises skimmed milk, sugar of milk, potassium chlorid, distilled water, properly mixed with a fat composed of the following ingredients:

| | |
|---|---|
| Tallow oil | 0 to 10 per cent. |
| Cocoanut oil | about 15 per cent. |
| Cocoa butter | about 20 per cent. |
| Cod liver oil | 10 per cent. |
| Tallow | 55 to 45 per cent. |

The method of mixing the ingredients to make up the artificial food is to use a modern pasteurizer as a warming and mixing machine for the skimmed milk, distilled water, sugar of milk and potassium chlorid.

The fat is not placed in the pasteurizer with the other ingredients but mixes with the other ingredients in a common tube or vent extending from the pasteurizing machine to the homogenizer. The homogenizer can be of any standard form such as the Manton-Gaulin machine which has a sufficient pressure to thoroughly break up the fats into globules or minute particles so that the ingredients from the pasteurizer and the fats will readily form a mixture in which the fat exists as a finer or coarser emulsion.

In mixing the various ingredients the water and skimmed milk are measured in bulk expressed in c. c. (cubic centimeters) while the other ingredients are measured by weight expressed in gm. (grammes).

In making a mixture or one unit of artificial food the following proportions are used:

| Unit. | Skimmed milk. | Distilled water. | Milk sugar. | Potassium chlorid. | VIII fat. |
|---|---|---|---|---|---|
| 1 | C. c. 3,430 | C. c. 6,450 | Gm. 600 | Gm. 2.6 | Gm. 385.0 |

It has not been thought necessary to show by a drawing the arrangement of the pasteurizer, the homogenizer and the container for the fat.

The pasteurizer is connected to the homogenizer by an inlet tube or vent provided with the usual valve for allowing the mixture to flow from the pasteurizer to the homogenizer.

The container for the fat is also connected to the same tube and by means of a valve the flow of the fat is regulated in proper proportion to the flow of the mixture from the pasteurizer.

The entire mixture then flows from the homogenizer through an outlet tube.

It is not necessary to have the liquid fat on the one hand and the other ingredients on the other run into a common tube each from separate containers if adequate agitation can be established in a common vat that will insure an adequate mixing of the fats with the other ingredients. Likewise some other form of apparatus than the homogenizer can be used as long as it makes possible an adequate emulsification of the fats.

Having thus described my invention what I desire to secure by Letters Patent is:

1. A composition of matter for artificial food consisting of proteins, water, carbohydrates, salts, accessory food factors and fats in about the proportions described for forming a food similar to human breast milk.

2. A composition of matter having milk as a basis, to which is added fats in the proportion described, the mixture so formed producing an anti-rachitic food for infants.

3. A composition of matter having milk as a basis, and containing a mixture of fats having Reichert-Meissl, saponification, iodin, Polenske numbers and melting point similar to those of human breast milk fat.

In testimony whereof I affix my signature in the presence of a witness.

HENRY J. GERSTENBERGER.

Witness:
H. POLATSEK.